United States Patent
Hood et al.

(10) Patent No.: US 7,264,538 B2
(45) Date of Patent: Sep. 4, 2007

(54) METHOD OF REMOVING A COATING

(75) Inventors: Paul L. Hood, Thomaston, CT (US); Kyle Gordon Gardiner, East Hampton, CT (US); Brian Keyes, Cromwell, CT (US); Keith Lockyer, Somers, CT (US); Edward Marchitto, Canton, CT (US); Thomas Robert Nadeau, West Hartford, CT (US); Daniel W. St. Onge, Enfield, CT (US); Bernard D. Vaillette, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 11/202,774

(22) Filed: Aug. 12, 2005

(65) Prior Publication Data

US 2007/0037492 A1 Feb. 15, 2007

(51) Int. Cl.
*B24B 1/00* (2006.01)

(52) U.S. Cl. .......................................... 451/28; 451/58

(58) Field of Classification Search ................. 451/28, 451/41, 129, 130, 182, 57, 58
See application file for complete search history.

(56) References Cited

U.S. PATENT DOCUMENTS

| | | | |
|---|---|---|---|
| 5,611,724 A * | 3/1997 | deGraaff ........................ 451/53 |
| 5,993,297 A * | 11/1999 | Hyatt et al. .................... 451/53 |
| 6,049,978 A | 4/2000 | Arnold |
| 6,123,606 A * | 9/2000 | Hill et al. ...................... 451/53 |
| 6,186,508 B1 * | 2/2001 | Zajchowski et al. ......... 277/355 |
| 6,796,877 B1 | 9/2004 | Bingham et al. |
| 2003/0088980 A1 | 5/2003 | Arnold |
| 2004/0031140 A1 | 2/2004 | Arnold et al. |
| 2004/0172825 A1 | 9/2004 | Memmen et al. |
| 2004/0172826 A1 | 9/2004 | Memmen et al. |

* cited by examiner

*Primary Examiner*—Robert A. Rose
(74) *Attorney, Agent, or Firm*—Kinney & Lange, P.A.

(57) ABSTRACT

A method of removing at least a part of a thermal sprayed wear resistant coating on a gas turbine engine part includes grinding the thermal sprayed wear resistant coating with a superabrasive grinding wheel.

12 Claims, 4 Drawing Sheets

METHOD OF REMOVING A COATING

BACKGROUND

The present invention relates to a method of removing a thermal sprayed wear resistant coating from a gas turbine engine part, and an apparatus for doing the same. More particularly, the present invention relates to a method of removing a thermal sprayed wear resistant coating from a gas turbine engine part with a superabrasive grinding wheel.

A gas turbine engine part formed of a metal alloy, such as brush seal components, blade outer air seals, blades, and vanes, may be damaged during use. For example, during operation, the gas turbine engine part may be exposed to high pressure, foreign particles, or in the case of a rotating component, centrifugal force in a hot corrosive environment. In order to help protect the metal alloy from damage, a gas turbine engine part may be coated with a thermal sprayed wear resistant coating ("coating"), such as a high velocity oxy-fuel (HVOF) coating. When a part is manufactured, the metal alloy component of the part may be formed in a smaller dimension than desired, and the coating may then be applied to the metal alloy in a thickness that gives the final part its desired (or "finished") dimension.

Over time, the coating may become worn (or "eroded"), which may affect the dimensions and performance of the part. The change in dimensions may be a concern for parts that require precise dimensions, such as a brush seal, where it is preferred that bristles remain in contact with a rigid, rotating member in order for the seal to be close-fitting and to discourage airflow through the seal. If the coating on a rotating member of a brush seal becomes worn, a leakage path may form, which could compromise the effectiveness of the brush seal.

When a gas turbine part is repaired, whether to correct the erosion of the coating or to repair the underlying metal alloy component, at least a part of the coating is typically removed. The present invention is a method of removing the thermal sprayed wear resistant coating from a gas turbine engine part.

BRIEF SUMMARY

The present invention is a method of removing at least a part of a thermal sprayed wear resistant coating on a gas turbine engine part with a superabrasive grinding wheel. The present invention is also an apparatus of removing at least a part of a thermal sprayed wear resistant coating on a gas turbine engine part, where the apparatus includes a superabrasive grinding wheel.

DETAILED DESCRIPTION

Figure 1A:
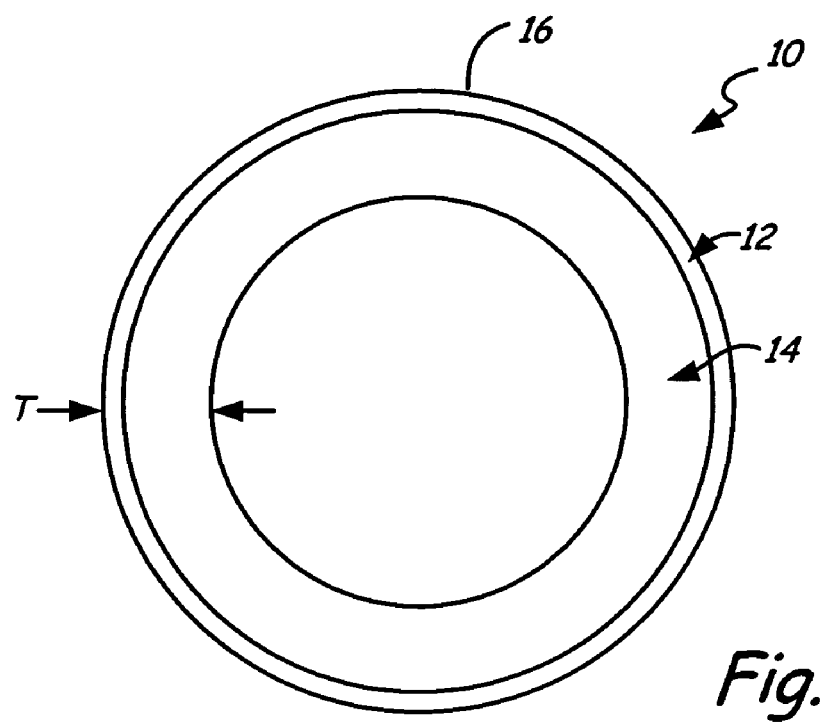
FIG. 1A is a schematic side view of a rotating member of a brush seal component in a gas turbine engine, where a thermal sprayed wear resistant coating has been applied to the rotating member so that the rotating member has a finished thickness.

The present invention is both a method of removing at least part of a thermal sprayed wear resistant coating of a gas turbine engine part and a method of repairing a gas turbine engine part that includes a thermal sprayed wear resistant coating. The gas turbine engine part may be a rotating or nonrotating part, and in an exemplary embodiment, the thermal sprayed wear resistant coating is produced by a HVOF process. The inventive method is characterized by grinding the coating with a superabrasive grinding wheel. In embodiments, the superabrasive grinding wheel may rotate at a rate of about 3,000 revolutions per minute (rpm), which translates to a coating removal rate of about 8,000 to about 10,000 surface feet per minute (sfpm).

A superabrasive grinding wheel is a grinding wheel that includes a metal core with a band of superabrasive material attached to the core to form a cutting surface. In comparison, a conventional abrasive grinding wheel is typically formed of abrasive and bond material throughout. In the present invention, any suitable bond system may be used to bond superabrasive material to a metal core, and any suitable core material may be used. In one embodiment, a resin bond cubic boron nitride (CBN) wheel with a core of steel, aluminum, or any other suitable metal is used. In another embodiment, a vitrified bond CBN grinding wheel with a core formed of steel or a vitrified abrasive is used. In yet another embodiment, an electroplated CBN grinding wheel is used, where CBN is electroplated onto a core. In yet another embodiment, a diamond-plated metal grinding wheel is used. Other embodiments are also possible. Those skilled in the art will recognize the variation in porosities associated with each type of bonding system, and will recognize that the bond system may be chosen based upon the particular application of the grinding wheel.

Although both superabrasive and traditional abrasive materials are hard, a superabrasive is much harder than a traditional abrasive. As used herein, a "superabrasive" material includes, but is not limited to, both natural and synthetic diamond materials, CBN, and mixtures of diamond and CBN. A "traditional/conventional abrasive" material includes aluminum oxide, silicon oxide, iron oxide, molybdenum oxide, vanadium oxide, tungsten carbide, and silicon carbide.

As stated in the Background section, when a gas turbine engine part is repaired, whether to correct the wear of a thermal sprayed wear resistant coating or to repair the underlying metal alloy component (i.e., the "base material"), at least a part of the coating is typically removed with a grinding method. Grinding is a process in which small abrasive particles imbedded in a grinding wheel, belt, cylinder, or stone remove material from a workpiece, whether it be for purposes of removing a layer of material, shaping or finishing the workpiece, or otherwise. The present invention provides an improved method of removing the thermal sprayed wear resistant coating from a gas turbine engine part with a superabrasive grinding wheel.

In conventional methods of removing a thermal sprayed wear resistant coating from a gas turbine engine part (or "workpiece"), a grinding wheel incorporating a traditional abrasive material is used. While the traditional abrasive grinding wheel is effective, the grinding process with a traditional abrasive grinding wheel may be time-consuming because of the limitations on its speed of rotation. The traditional abrasive grinding wheel also requires frequent maintenance, such as a frequent "dressing" of the grinding wheel. When a grinding wheel is "dressed", a dressing wheel or stick is applied to the abrasive surface as it spins so as to selectively wear away the bond material between the abrasive crystals, thereby exposing newer, sharp abrasive crystals and reestablishing the profile geometry on the grinding wheel. Some dressing processes are inefficient because the grinding wheel operator must stop the grinding process in order to "dress" the wheel. Furthermore, a conventional abrasive grinding wheel may need to be replaced frequently because the abrasive particles may wear down over time, which may then affect the wheel's effectiveness as well as the wheel's ability to accurately grind a workpiece because of a change in wheel dimensions.

In the present invention, a grinding wheel incorporating a superabrasive material is used to remove at least part of a thermal sprayed wear resistant coating on a gas turbine engine part. In embodiments of the present invention, a CBN grinding wheel may be used to remove a HVOF coating on a gas turbine engine part. Prior to the present invention, questions remained as to whether CBN exhibited sufficient hardness to grind a thermal sprayed wear resistant coating, such as a HVOF coating. These concerns about the hardness of CBN limited the application of CBN grinding wheels. The inventors of the present invention discovered that CBN is hard enough to remove a HVOF coating from a gas turbine engine part, and a CBN grinding wheel is an effective and efficient means for removing the HVOF coating. Based on this discovery, the inventors believe that the present invention, which may incorporate a CBN grinding wheel, is applicable to thermal sprayed wear resistant coatings that exhibit properties similar to a HVOF coating.

The present invention also recognizes that a method of removing a coating from a workpiece with a superabrasive grinding wheel other than a CBN wheel, such as a metal grinding wheel with a band of diamond particles, is generally more efficient than a method incorporating a traditional abrasive grinding wheel because of the hardness properties of a superabrasive material. A superabrasive material is typically harder than a traditional abrasive material, where hardness is measured in terms of hardness properties known in the art, such as the Rockwell or Vickers hardness tests. Due to its increased hardness properties, a superabrasive grinding wheel generally stays sharper longer than a conventional abrasive grinding wheel.

The efficiency attributable to the harder superabrasive material is at least four fold. First, the number of times a grinding wheel is changed and replaced with a new grinding wheel is decreased because the superabrasive hardness properties contribute to a slower wheel wear, and thus, a sharper grinding wheel over a longer period of usage. Otherwise stated, the wheel life of a superabrasive grinding wheel is longer as compared to conventional abrasive grinding wheels because the harder superabrasive material wears down slower than a conventional abrasive material. Second, a superabrasive grinding wheel generally does not have to be dressed as often as a conventional abrasive grinding wheel because a superabrasive stays sharper longer than a conventional abrasive. As a result, less time is consumed with dressing superabrasive grinding wheels.

A third aspect of efficiency is the superabrasive grinding wheel exhibits a greater dimensional stability (i.e., it maintains its shape longer) because of the superabrasive hardness properties, which enables the superabrasive grinding wheel to grind the workpiece more accurately as compared to a traditional abrasive grinding wheel. Finally, a superabrasive grinding wheel allows for faster removal rates as compared to conventional abrasives because of its hardness and sharpness properties. In embodiments of the present invention, a superabrasive grinding wheel may remove a coating from a workpiece using a peripheral speed of about 8,000 to about 10,000 sfpm, and up to 20 times more material may be removed with each grinding wheel increment as compared to a conventional grinding wheel. Contributing to the fast removal rate is the high-speed grinding ability of a superabrasive grinding wheel. In the present invention, the superabrasive grinding wheel may rotate at any suitable rate, and in embodiments, may rotate at a rate of at least 3,000 rpm. In embodiments, a 9.125-inch diameter grinding wheel may rotate at a rate of about 3,800 rpm, or about 9078 sfpm. In comparison, a 12-inch diameter conventional abrasive grinding wheel rotates at about 1400 rpm, or about 4398 sfpm.

If a CBN grinding wheel is used in the present invention, the surface temperature of the workpiece may be lowered because CBN conducts heat. A lower workpiece surface temperature helps to decrease the damage to the underlying metal alloy as compared to traditional abrasives, most of which do not conduct heat as well some superabrasives.

In embodiments of the present invention, the method of removing a coating from a gas turbine engine part may include a creep feed grinding process. In creep feed grinding, material may be removed from a surface of a workpiece in fewer passes than in traditional grinding. A machine table (or a rotary table) feeds a workpiece in the direction of the grinding wheel rotation. While the table speed is slow (i.e., "creep feed"), the depth of cut from the grinding wheel is high, which results in a high material removal rate.

FIG. 1A is a schematic side view of rotating member 10 of a brush seal in a gas turbine engine, where thermal sprayed wear resistant coating 12 has been applied to metal alloy body 14 so that the rotating member has finished (or "desired") thickness T. Thermal sprayed wear resistant coating 12 may be a HVOF coating, or any suitable thermal sprayed wear resistant coating known in the art. Metal alloy body 14 may be formed of any suitable metal alloy. During operation, bristles (not shown in FIG. 1A) of the brush seal contact surface 16 to form an air seal. If there is a gap between the bristles and contact surface 16, a pathway for air may form, which may then compromise the effectiveness of the brush seal.

Figure 1B:
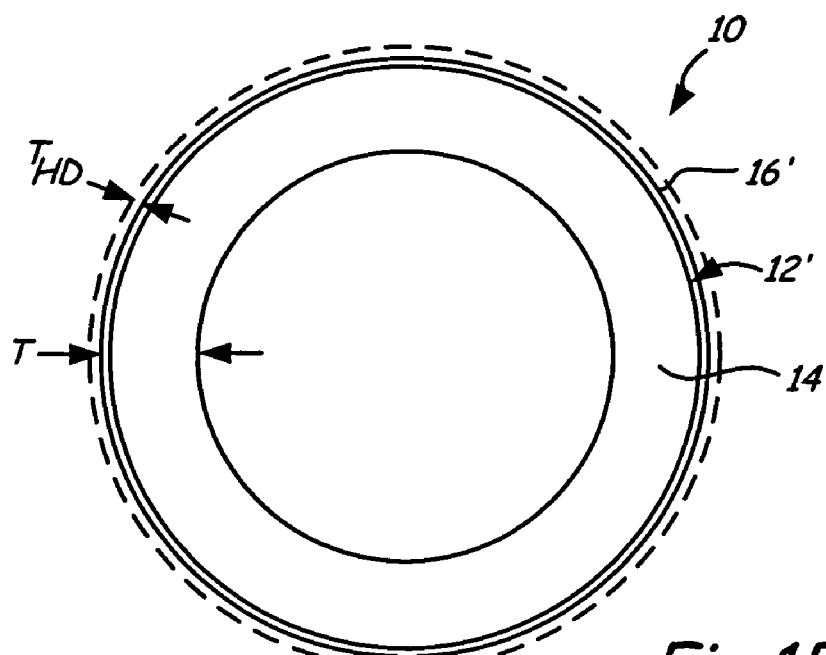
FIG. 1B is a schematic side view of the rotating member of FIG. 1A, where the thermal sprayed wear resistant coating has been worn, so that the thickness of the rotating member is no longer at the finished thickness.

FIG. 1B is a schematic side view of rotating member 10 of FIG. 1A, where thermal sprayed wear resistant coating 12 has been worn to coating 12', so that thickness T' of the rotating member is no longer substantially equal to the finished thickness T. A phantom line shows the desired thickness T of rotating member 10 and illustrates the wear of thermal sprayed wear resistant coating 12'. Specifically, thickness $T_{HD}$ (which is equal to the difference between finished thickness T and worn thickness T' of rotating member 10) of thermal sprayed wear resistant coating 12 has been worn away. Although FIG. 1B shows the wear of thermal sprayed wear resistant coating 12' to be uniform, in practice, worn surface 16' of thermal sprayed wear resistant coating 12' may be uneven, where thermal sprayed wear resistant coating 12' is thicker in some parts than in others (where a thickness is measured along the same general direction as thickness $T_{HD}$).

If thermal sprayed wear resistant coating 12' is worn such that the thickness of rotating member 10 is decreased from desired thickness T to worn thickness T', it may affect the contact surface of the bristles of the brush seal to contact surface 16' of rotating member 10. As previously stated, this may compromise the effectiveness of the brush seal, and it may be desirable to repair thermal sprayed wear resistant coating 12' such that rotating member 10 is once again at desired thickness T. In some existing methods of repairing such a worn surface 16', it may be necessary to remove all or substantially all of the existing thermal sprayed wear resistant coating 12', such that the underlying metal alloy body 14 (or other base material) is exposed, before reapplying a thermal sprayed wear resistant coating material. In current methods of removing thermal sprayed wear resistant coating 12', a traditional abrasive grinding wheel is mounted on a machine that rotates the grinding wheel, and the grinding wheel is positioned to contact the thermal sprayed wear resistant coating, thereby removing thermal sprayed wear resistant coating 12'. However, in a method of the present invention, a superabrasive grinding wheel is used to remove thermal sprayed wear resistant coating 12' from rotating member 10.

A superabrasive grinding wheel in accordance with the present invention may be mounted on a conventional machine that is currently used with a traditional abrasive grinding wheel. Of course, a superabrasive grinding wheel replaces the traditional abrasive grinding wheel. Modifications to the conventional machine may be required. Those skilled in the art will recognize that such modifications may be necessary to achieve higher spindle rpm, proper coolant delivery and filtration, and machine enclosure (if necessary or desired).

Figure 2:
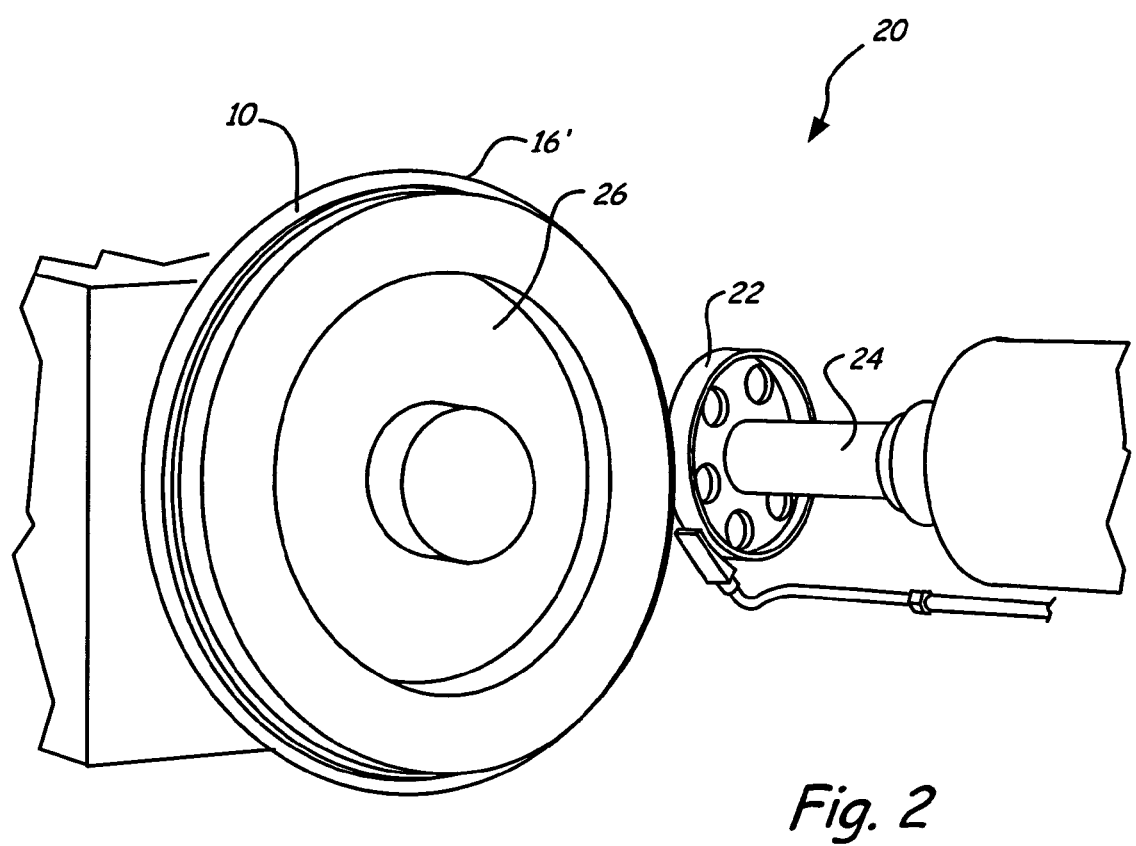
FIG. 2 is a perspective view of a first embodiment of the present invention, where a superabrasive grinding wheel has been implemented onto a machine including a vertical rotary table, on which the rotating member of FIG. 1B has been mounted.

FIG. 2 shows a partial perspective view of an exemplary embodiment of grinding machine 20 incorporating CBN grinding wheel 22. Machine 20 is a general depiction of a grinding machine known in the art, and many details of machine 20 have been left out for clarity of illustration. Machine 20 may be any suitable grinding machine, such as Makino machine models MC98 and MC86, which are made commercially available by Makino, Mason, Ohio. Machine 20 includes spindle 24, on which CBN grinding wheel 22 is mounted, and vertically mounted rotary table 26. Both spindle 24 and rotary table 26 are configured to rotate about a fixed axis.

Spindle 24 is configured to rotate at a high speed during operation, such that CBN grinding wheel 22 also rotates at a high speed. In embodiments, spindle 24 may rotate at about 3,000 rpm. The abrasive face of CBN grinding wheel 22 follows the same path during each rotation because CBN grinding wheel 22 rotates about a fixed axis.

In order to remove some or all of thermal sprayed wear resistant coating 12' from rotating member 10, rotating member 10 of FIG. 2 is mounted on rotary table 26. During operation of machine 20, CBN grinding wheel 22 is positioned to contact rotating member 10. In order to remove some or all of thermal sprayed wear resistant coating 12 from rotating member 10, spindle 24, and thus, CBN grinding wheel 22, rotates at a high speed while contacting worn surface 16' of rotating member 10. While spindle 24 is rotating at a high speed, rotary table 26 rotates at a slower speed than spindle 24, to "creep feed" worn surface 16' of rotating member 10 into contact with CBN grinding wheel 22. That is, rotary table 26 is gradually rotated during operation of machine 20 so that worn surface 16' of rotating member 10 is gradually exposed to CBN grinding wheel 22. The combination of superabrasive grinding wheel 22 and the slower part (i.e., workpiece) rotation can result in deeper cutting (i.e., removal of more thermal sprayed wear resistant coating 12 in a single pass of CBN grinding wheel 22) as compared to the known grinding machines. If a workpiece is not circular like rotating member 10, machine 20 may also incorporate any suitable work piece supporting member.

In embodiments, machine 20 may remove thermal sprayed wear resistant coating 12 (shown in FIG. 1) of rotating member 10 at a peripheral speed of about 8,000 to about 10,000 sfpm. In, most grinding machines, an operator is able to precisely control the placement of rotating member 10 (or other workpiece) and the speed of CBN grinding wheel 22, thereby allowing the operator to accurately remove thermal sprayed wear resistant coating 12.

Figure 3:
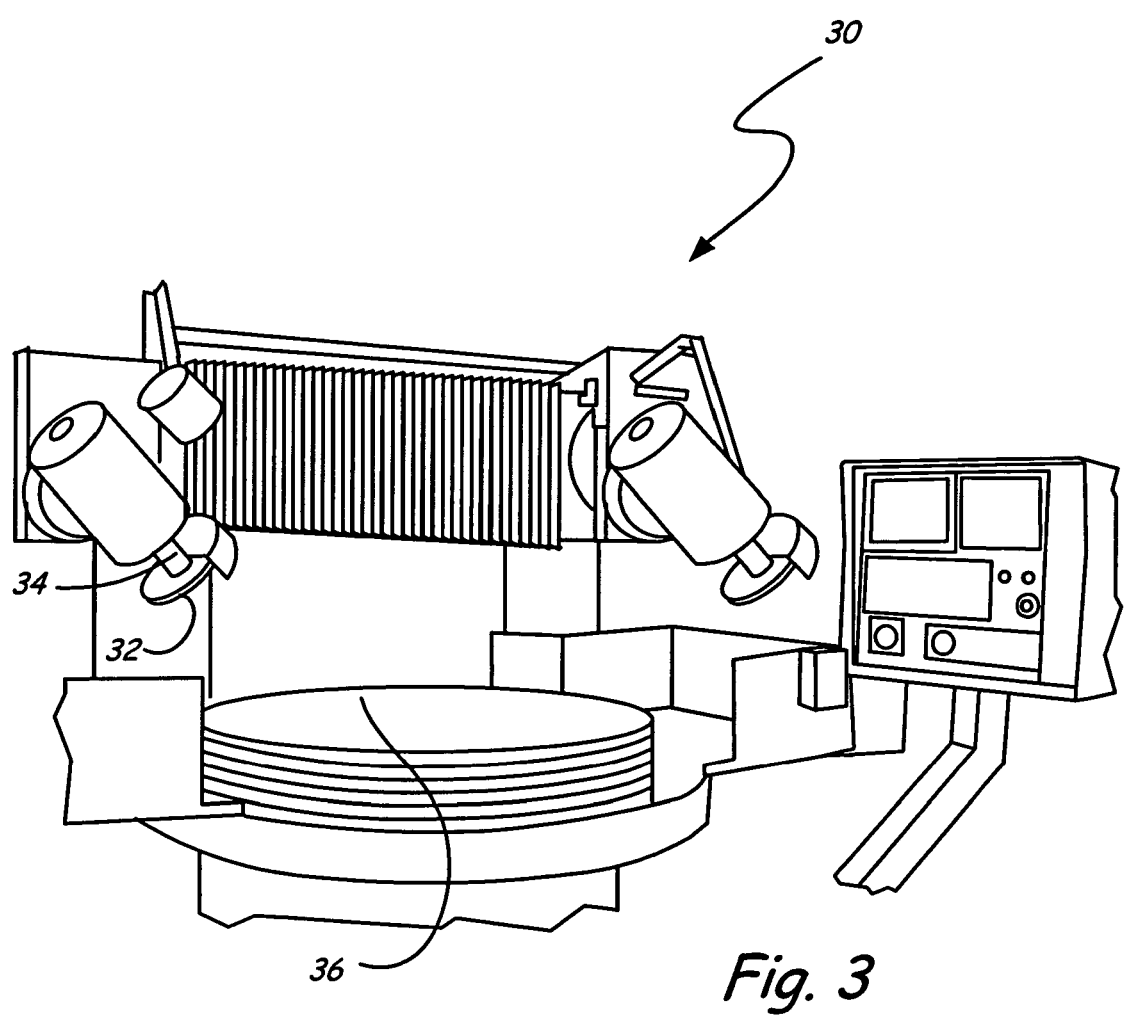
FIG. 3 is a perspective view of a second embodiment of the present invention, where a superabrasive grinding wheel has been implemented onto a machine including a horizontal rotary table.

FIG. 3 is a second exemplary embodiment of rotary grinding machine 30, which includes CBN grinding wheel 32 mounted on rotating spindle 34, and horizontally-mounted rotary table 36. Rotary table 36 is configured to receive a workpiece (not shown in FIG. 3). Rotary grinding machine 30 differs from rotary grinding machine 20 of FIG. 2 in that rotary table 36 is horizontally mounted rather than vertically mounted, as with rotary table 26 in FIG. 2. Furthermore, rotating spindle 34 may be adjusted so that CBN grinding wheel 32 contacts a workpiece (not shown in FIG. 3) that is placed on rotary table 36 at various angles. In FIG. 3, spindle 34 is angled at 45 degrees with respect to a top surface of rotary table 36.

Figure 4:
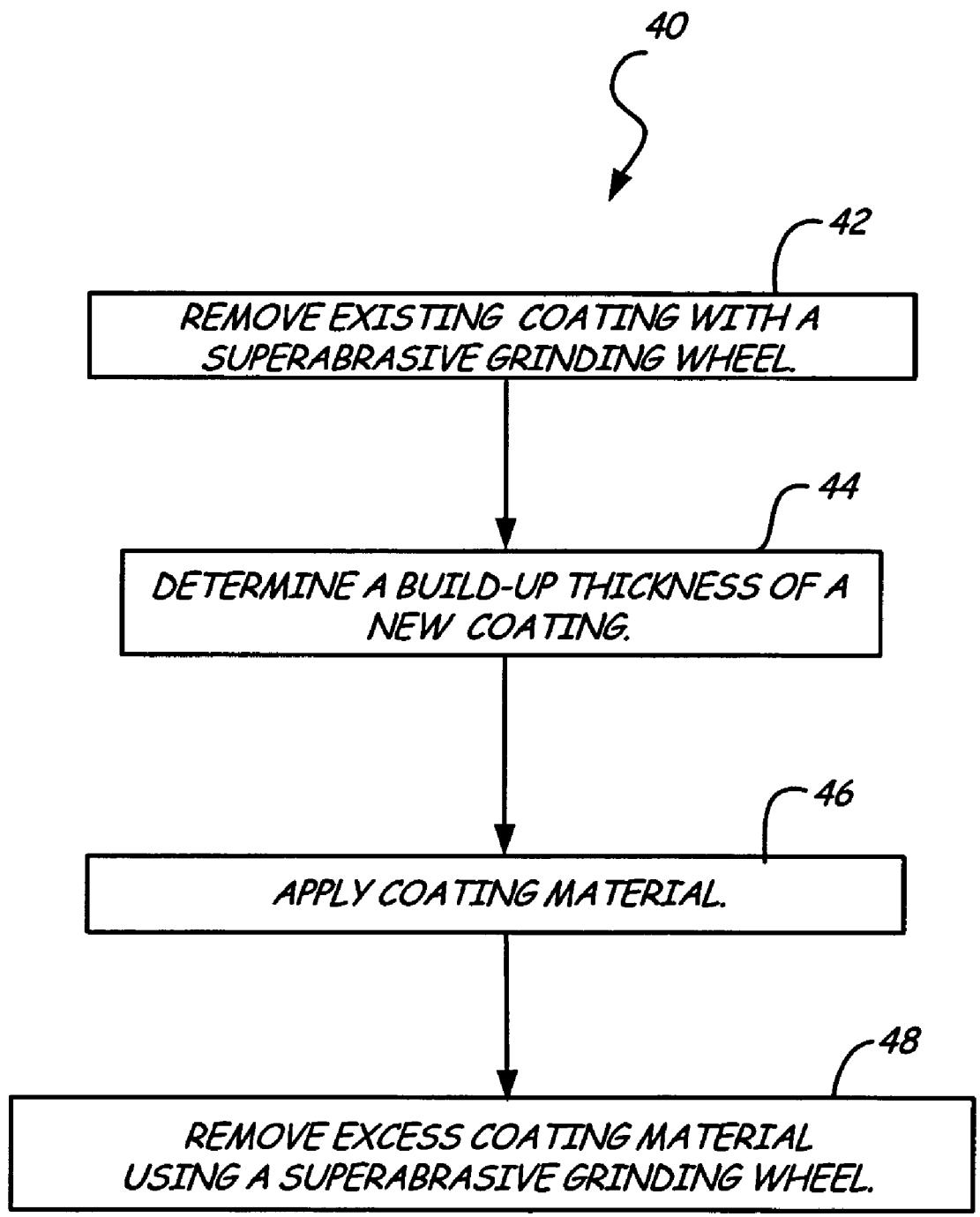
FIG. 4 is a flow chart of a method of repairing a gas turbine workpiece, where the method includes removing a thermal sprayed wear resistant coating with a superabrasive grinding wheel.

FIG. 4 is flow chart 40 illustrating a method of repairing a gas turbine engine part in accordance with the present invention, where the method is characterized by the use of a superabrasive grinding wheel to remove a thermal sprayed wear resistant coating from the part. As previously stated, the thermal sprayed wear resistant coating of a gas turbine engine part may need to be repaired if it has worn over time. In order to repair the coating, all or some of the coating may need to be removed. Even if the thermal sprayed wear resistant coating is not worn, a gas turbine engine part may still need repair that requires all or substantially all of the coating to be removed. For example, if the metal alloy body (or a body formed of another material) underlying the thermal sprayed wear resistant coating is damaged, it is likely that the thermal sprayed wear resistant coating may need to be removed prior to repairing the underlying body.

In step 42 of the method of the present invention, all or part of an existing thermal sprayed wear resistant coating may be removed from the part with a superabrasive grinding wheel. For example, the part may be mounted on rotary table 26 or 36 of rotary grinding machine 20 or 30, respectively, and CBN grinding wheels 22 or 32, respectively, may remove the existing thermal sprayed wear resistant coating. Step 42 may not be necessary in all methods of repairing a gas turbine engine part.

Following optional step 42 is step 44, during which a build-up thickness of the new thermal sprayed wear resistant coating of the part is determined. A build-up thickness is generally equal to the thickness of the thermal sprayed wear resistant coating layer required to give the part its finished thickness (or dimension). The term, "thickness" is used to generally indicate a dimension. The finished dimension is the dimension required to place the part in condition for use in the gas turbine engine. For example, with rotating member 10 shown in FIGS. 1 and 2, a build-up thickness is the difference between finished thickness T and worn thickness T', or if existing thermal sprayed wear resistant coating 12' is removed prior to applying a new thermal sprayed wear resistant coating, the build-up thickness is the difference between finished thickness T and the thickness of metal alloy body 14 (where the thickness is measured in generally the same direction as thickness T).

In step 46, a thermal sprayed wear resistant coating material is applied to the exterior surface of the part in a thickness greater than or equal to the build-up thickness that was determined in step 44. The portions of the part that do not need to be coated with the wear resistant material may be masked prior to step 46 using a method known in the art. The wear resistant coating is applied using any suitable overlay coating process known in the art. In one exemplary embodiment of the method of the present invention, feedstock material is axially fed into a high-energy heat source where the material is melted/softened and accelerated at high velocities to the surface of the part. Upon impact, the individual particles rapidly solidify, thereby forming the coating. In the HVOF process, combustion of oxygen and fuel (i.e., hydrogen) provide heat for the gases and powders, and the free expansion of the stream of hot gases upon exiting the gun barrel generates the high gas velocities.

The thermal sprayed wear resistant coating in step 46 may be applied in a thickness greater than the build-up thickness. As a result, the part may have a greater thickness than desired. The thickness in excess of the desired thickness is designated an "excess thickness". In step 48, the excess thickness may be removed from the part with a superabrasive grinding wheel. Once again, the superabrasive grinding wheel may be used in conjunction with machine 20 or 30 shown in FIGS. 2 and 3, respectively, or any other suitable machine. Because a superabrasive grinding wheel may be used to accurately remove thermal sprayed wear resistant coating material from the part, the excess thickness of the coating material may be precisely removed from the part. The superabrasive grinding wheel may also be used to reestablish the part shape, for example, if the thermal sprayed wear resistant coating is thicker in some areas than in others.

While the present invention has been described with reference to an exemplary embodiment, a CBN grinding wheel, workers skilled in the art will recognize that the advantages of a CBN grinding wheel are applicable to a grinding wheel incorporating any suitable superabrasive material. Similarly, rotating member 10 of a brush seal is an exemplary workpiece that is used to describe the present invention. The present invention may be used to remove a thermal sprayed wear resistant coating from any part of a gas turbine engine incorporating a thermal sprayed wear resistant coating, such as turbine disks and hubs.

The present invention also includes an apparatus for removing at least a part of a thermal sprayed wear resistant coating on a gas turbine engine part. The apparatus includes a superabrasive grinding wheel and a rotating device capable of rotating the superabrasive grinding wheel at a rate of at least 3000 revolutions per minute.

Although the present invention has been described with reference to preferred embodiments, workers skilled in the art will recognize that changes may be made in form and detail without departing from the spirit and scope of the invention.

The invention claimed is:

1. A method of repairing a gas turbine engine part, the method comprising:
   removing at least a part of an existing thermal sprayed wear resistant high velocity oxy-fuel coating from the gas turbine engine part with a rotating superabrasive grinding wheel;
   determining a build-up thickness of a thermal sprayed wear resistant coating material required to obtain a desired post-repair dimension of the gas turbine engine part;
   applying a new thermal sprayed wear resistant coating to the gas turbine engine part; and
   removing any excess thickness of the thermal sprayed wear resistant coating material on the gas turbine engine part in order to achieve the desired post-repair dimension, wherein the excess thickness is the difference between the application thickness and the build-up thickness of the thermal sprayed wear resistant coating material, and wherein the excess thickness of the thermal sprayed wear resistant coating material is removed with a superabrasive grinding wheel.

2. The method of claim 1, wherein the gas turbine engine part is a component of a brush seal, a blade outer air seal, a blade, or a vane.

3. The method of claim 1, wherein the superabrasive grinding wheel removes the thermal sprayed wear resistant coating at a peripheral speed of about 8,000 to about 10,000 surface feet per minute.

4. The method of claim 1, wherein the superabrasive grinding wheel rotates at a rate of at least about 3,000 revolutions per minute.

5. The method of claim 1, wherein the superabrasive grinding wheel includes a superabrasive material comprising at least one of cubic boron nitride and diamond.

6. The method of claim 1, wherein removing the thermal sprayed wear resistant coating from the gas turbine engine part includes creep feeding the gas turbine engine part to the superabrasive grinding wheel.

7. A method of repairing a gas turbine engine part, the method comprising:
   determining a build-up thickness of a thermal sprayed wear resistant coating material required to obtain a desired post-repair dimension of the gas turbine engine part;
   applying the thermal sprayed wear resistant coating material to the gas turbine engine part in an application thickness; and
   removing any excess thickness of the thermal sprayed wear resistant coating material on the gas turbine engine part in order to achieve the desired post-repair dimension, wherein the excess thickness is the difference between the application thickness and the build-up thickness of the thermal sprayed wear resistant coating material, and wherein the excess thickness of the thermal sprayed wear resistant coating material is removed with a superabrasive grinding wheel.

8. The method of claim 7, wherein the gas turbine engine part is a component of a brush seal, a blade outer air seal, a blade, or a vane.

9. The method of claim 7, wherein the superabrasive grinding wheel rotates at a rate of at least about 3,000 revolutions per minute.

10. The method of claim 7, wherein the superabrasive grinding wheel includes a superabrasive material comprising at least one of cubic boron nitride and diamond.

11. The method of claim 7, wherein the thermal sprayed wear resistant coating is a high velocity oxy-fuel coating.

12. The method of claim 7, wherein removing the excess thickness of the thermal sprayed wear resistant coating includes a creep feed grinding process.

* * * * *

UNITED STATES PATENT AND TRADEMARK OFFICE
CERTIFICATE OF CORRECTION

PATENT NO. : 7,264,538 B2  Page 1 of 1
APPLICATION NO. : 11/202774
DATED : September 4, 2007
INVENTOR(S) : Paul L. Hood et al.

It is certified that error appears in the above-identified patent and that said Letters Patent is hereby corrected as shown below:

On the title page item (56), insert -- Other Art
Deep Cut and Creep Feed Grinding,
Norton Company, Copyright 1987,
pp. 26 and 82-89--

Column 6, Line 10, delete "In, most", insert --In most--

Signed and Sealed this

Twenty-third Day of September, 2008

JON W. DUDAS
*Director of the United States Patent and Trademark Office*